United States Patent [19]

Buschbeck et al.

[11] 4,015,132
[45] Mar. 29, 1977

[54] X-RAY FILM HOLDER

[75] Inventors: Jürgen Buschbeck, Norderstedt; Wilfried Pfeiffer, Quickborn, both of Germany

[73] Assignee: U.S. Philips Corporation, New York, N.Y.

[22] Filed: Aug. 4, 1975

[21] Appl. No.: 601,462

[30] Foreign Application Priority Data

Aug. 3, 1974 Germany .......................... 2437453

[52] U.S. Cl. .............................................. 250/481
[51] Int. Cl.² ......................................... G03C 5/16
[58] Field of Search ........... 250/480, 481, 482, 468

[56] References Cited

UNITED STATES PATENTS

| | | |
|---|---|---|
| 2,056,279 | 10/1936 | Kulick ................................ 250/480 |
| 3,784,835 | 1/1974 | Schmidt ............................ 250/480 |
| 3,836,783 | 9/1974 | Stieuenart et al. ................ 250/481 |
| 3,870,889 | 3/1975 | Schmidt ............................ 250/482 |

*Primary Examiner*—Alfred E. Smith
*Assistant Examiner*—B. C. Anderson
*Attorney, Agent, or Firm*—Frank R. Trifari; Ronald L. Drumheller

[57] ABSTRACT

An X-ray film holder comprising a bent base plate and a flexible cover plate which can be pressed against the base plate by means of a lever. The axis of rotation of the lever is situated substantially in the plane of the base plate. The film holder prevents friction between base plate and cover plate and facilitates the insertion and removal of the film.

1 Claim, 2 Drawing Figures

Fig. 1

X-RAY FILM HOLDER

BACKGROUND AND SUMMARY OF THE INVENTION

The invention relates to an X-ray film holder comprising a rigid, bent base plate and a flexible cover plate which can be pressed against the base plate and which is connected thereto near one end edge by means of a first fixing rod, the said cover plate being displaceable with respect to the base plate by way of a second fixing rod which is parallel to the first rod.

In a known film holder of the kind set forth (U.S. Pat. No. 3,153,145) the said second rod is pivotably connected to the cover plate in four locations by means of brackets. When the cover plate is pressed against the base plate, lateral projections on the second rod engage underneath strips connected to the base plate, so that the cover plate is subject to compression and tensile forces. These forces are transferred to the cover plate at the area of the fixing brackets. It is a drawback of the local transfer of forces between the rod and the cover plate that uniform contact pressure between base plate and cover plate is not ensured.

The invention has for its object to provide a film holder wherein the said drawback is avoided.

To this end, the invention is characterized in that near both its ends the second bar is connected to the base plate by way of a transverse arm, the second rod and the transverse arms being pivotable together about an axis which extends parallel to the base plate and which is situated substantially in the plane of the base plate as far as beyond the position wherein the first rod, the second rod and the rotary axis are situated substantially in the same plane.

The invention will be described in detail hereinafter with reference to the drawing.

DESCRIPTION OF THE PREFERRED EMBODIMENTS

Figure 1:
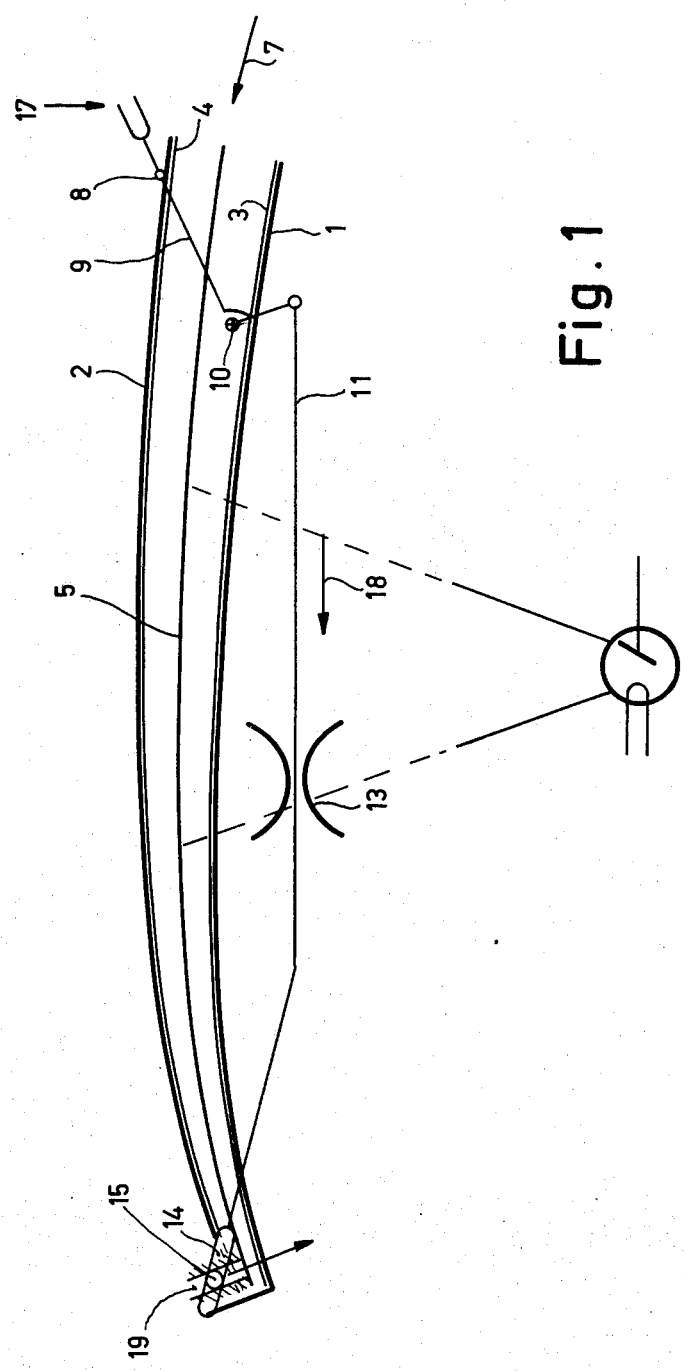
FIG. 1 is a diagrammatic sectional view of a preferred embodiment of a film holder according to the invention.
Figure 2:
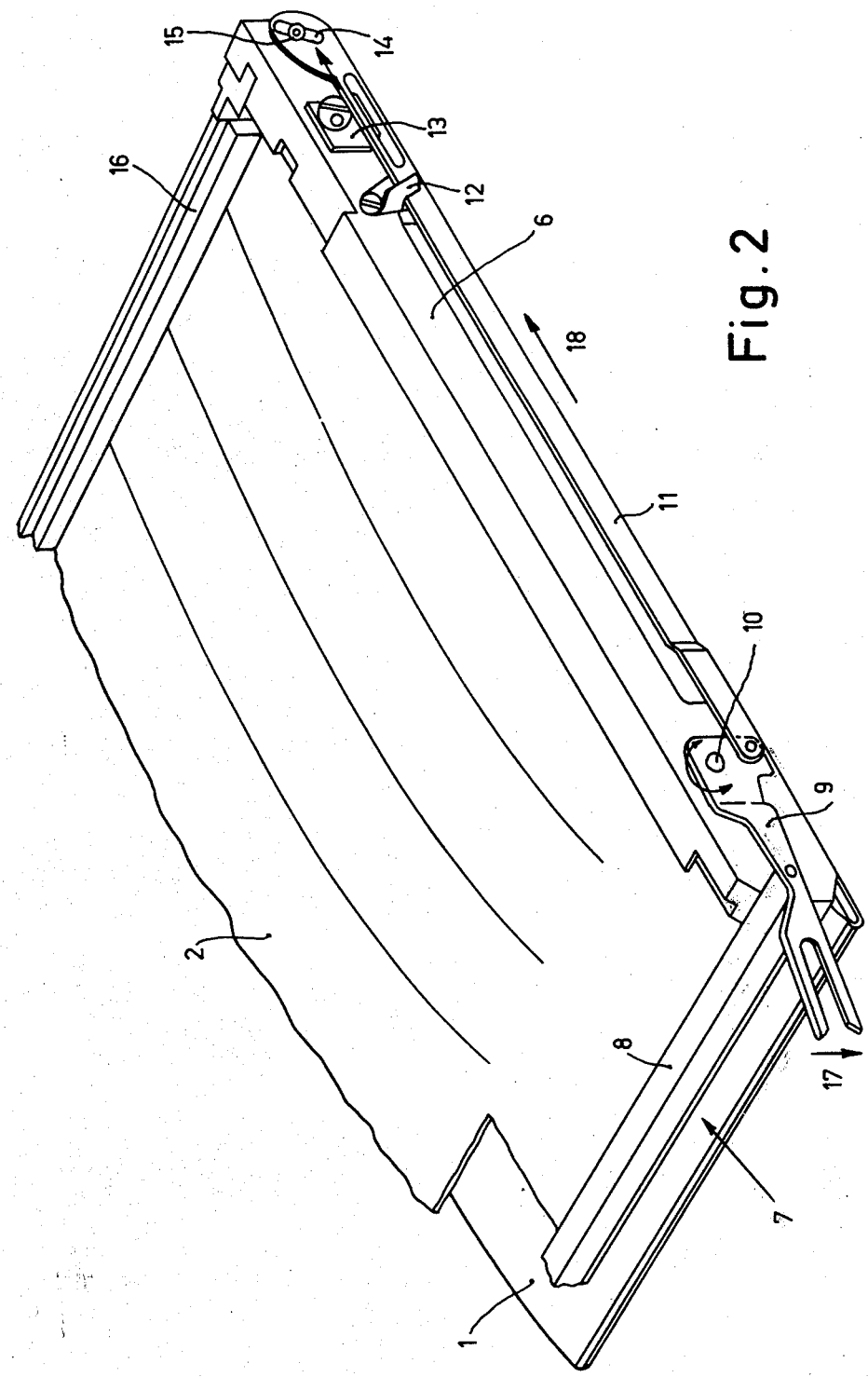
FIG. 2 is a perspective view of the film holder shown in FIG. 1.

The film holder shown in the FIGS. 1 and 2 comprises a base plate 1 which consists of a bent aluminium plate having a thickness of 1½ mm. The aluminium plate is bent to be substantially parabolic. The base plate 1 is reinforced by lateral, symmetrically situated supporting strips 6 (FIG. 1 shows only one of the supporting strips, the other supporting strips being situated on the side of the film holder not shown). On the convex side of the base plate 1 there is provided a cover plate 2 which is formed by a brass plate having a thickness of ½ mm. On the facing sides of the cover plate 2 and the base plate 1 there are provided intensifier screens 3 and 4. The intensifier screen 3 on the base plate 1 is preferably provided with a felt underlayer to compensate for any shape deviations liable to occur during the manufacture of the base plate 1.

The film 5 to be exposed (see FIG. 1) is inserted between the two plates in the direction of the arrow 7. When the cover plate is pressed by exerting a pressure on the foremost edge facing the entrance side, the cover plate is bent approximately parabolically in accordance with the curvature of the base plate. The pressure will be uniform over the entire surface of the film, because the rod 8 exerts a uniform tensile force on the cover plate over the full width of the plate.

On the front edge of the cover plate 2 there is provided a first fixing rod 8 which laterally projects from the cover plate and which is connected to a lever 9 which is pivotable on the supporting strip 6 at the area 10. The lever 9 has connected thereto a guide rod 11 which is guided parallel to the supporting strip 6 by means of the guides 12 and 13. The rod 11 is provided with a slot 14 wherein a trunnion 15 is slidable, the said trunnion being provided on a second fixing rod which is secured on the cover plate.

After insertion of the film to be exposed, the lever 9 is pushed downwards in the direction of the arrow 17. The resistance offered by the cover plate 2 to this closing movement initially increases until the cover plate reaches approximately the level of the pivot 10. The rods 8 and 16 and the rotary axis 10 are then situated in substantially the same plane. At this point the tensile force in the longitudinal direction of the cover plate is maximum. When the lever is moved further downwards, the tensile force in the cover plate decreases, the rod 8 then being subject to a downwards directed force, with the result that the cover plate is pressed against the base plate. Permanent contact during the X-ray exposure can be ensured by using a spring (not shown for the sake of simplicity).

While the lever 9 is being moved down, the guide rod 11 connected to the lever moves backwards in the direction of the arrow 18. The trunnion 15, guided in a recess 19 extending perpendicular to the base plate (see FIG. 1) in the strip 6, then moves downwards, and hence also the rod 16, so that the cover plate is pressed against the film also on the rear. The lengths of the recess 19 and the slot 14 are chosen to be such that the trunnion 15 has already reached its lowermost position when the front edge of the cover plate has not yet been pressed against the base plate. The pressure between cover plate and base plate thus first reaches its ultimate value on the rear edge of the cover plate, subsequently in the central portion, and finally on the front edge. As a result, the air present between the plates is forced out in the forward direction, so that air inclusions which might have an adverse effect on the definition of the exposure are avoided.

When the film holder is opened, the front end of the lever 9 must be moved upwards against an initially increasing resistance until the dead point is reached, the cover plate then being situated approximately at the level of the pivot 10. When this dead point has been passed, the rod 8 and the front end of the lever 9 move upwards in an accelerated manner. During this movement of the lever 9 the rod 11 is moved forwards, so that the trunnion 15 and hence the rear edge of the cover plate 2 are lifted. It is thus achieved, that after the opening, the cover plate is situated at some distance from the base plate at all areas, so that an exposed film can be readily removed and an unexposed film can be readily inserted.

It is alternatively possible to connect the rod 16 rigidly to the supporting strips 6 and to dispense with the guide rods 11, even though the insertion and removal of a film could then be accompanied by some friction. The levers 9 can then be simply constructed as transverse arms.

What is claimed is:

1. An x-ray film holder, comprising:
   a generally rectangular rigid base plate for receiving x-ray film on one side thereof, said base plate arching toward the x-ray film from first and second opposing edges thereof;
   a flexible cover plate for said base plate;
   first and second rods supporting said flexible cover plate along first and second edges thereof corresponding respectively to said first and second opposing edges of said base plate;
   two lever arms supporting opposite ends of said first rod for displacing said first rod toward said base plate and flexing said cover plate about and against said base plate, said arms being pivotable about a common axis which is parallel to said first edge of said base plate and in substantially the plane of said base plate at a position intermediate said first and second edges thereof;
   a trunnion supporting each end of said second rod; and
   a guide rod corresponding to and longitudinally displaced by each of said lever arms, each of said guide rods having a slot supporting one of said trunnions for displacing said second rod toward and away from said base plate.

* * * * *